US010812605B2

(12) United States Patent
Rajiv et al.

(10) Patent No.: US 10,812,605 B2
(45) Date of Patent: Oct. 20, 2020

(54) MESSAGE QUEUE-BASED SYSTEMS AND METHODS FOR ESTABLISHING DATA COMMUNICATIONS WITH INDUSTRIAL MACHINES IN MULTIPLE LOCATIONS

(71) Applicant: General Electric Company, Schenectady, NY (US)

(72) Inventors: Vrinda Rajiv, Guilderland, NY (US); Mark Mitchell Kornfein, Colonie, NY (US); Christina Ann Leber, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 15/430,007

(22) Filed: Feb. 10, 2017

(65) Prior Publication Data
US 2018/0234514 A1 Aug. 16, 2018

(51) Int. Cl.
*H04L 29/08* (2006.01)
*G06F 9/54* (2006.01)
(Continued)

(52) U.S. Cl.
CPC .............. *H04L 67/26* (2013.01); *G06F 9/546* (2013.01); *H04L 67/06* (2013.01); *H04L 67/125* (2013.01);
(Continued)

(58) Field of Classification Search
CPC ....... H04L 67/10; H04L 67/125; H04L 43/04; H04L 43/045; H04L 43/06;
(Continued)

(56) References Cited

U.S. PATENT DOCUMENTS 6,487,479 B1 11/2002 Nelson
6,671,715 B1 12/2003 Langseth et al.
(Continued)

OTHER PUBLICATIONS

Normanyo et al.; Developing a Human Machine Interface (HMI) for Industrial Automated Systems using Siemens Simatic WinCC Flexible Advanced Software; Feb. 2014; Journal of Engineering Trends in Computing and Information Sciences; vol. 5, pp. 1-11 (Year: 2014).*
(Continued)

*Primary Examiner* — Tonia L Dollinger
*Assistant Examiner* — Linh T. Nguyen
(74) *Attorney, Agent, or Firm* — Buckley, Maschoff & Talwalkar LLC

(57) ABSTRACT

Method, and corresponding system, for establishing data communications with, and instructing, industrial machines in multiple locations. The method includes generating, using a first application, one or more machine communication messages. Each machine communication message contains data produced by one of a plurality of machines located at a first location. An instance of the first application runs on a processor of each of the plurality of machines. The method further includes sending the machine communication messages to a first message queue via a local area network. The method further includes retrieving, using a first server at a remote location connected via a network, the machine communication messages from the first message queue; and extracting from the messages, at the remote location, the data produced by the plurality of machines. The sending of the machine communication messages and the retrieving of the machine communication messages are done asynchronously.

19 Claims, 5 Drawing Sheets

(51) Int. Cl.
*H04W 4/70* (2018.01)
*H04L 12/58* (2006.01)
(52) U.S. Cl.
CPC .............. *H04L 51/20* (2013.01); *H04L 67/02* (2013.01); *H04W 4/70* (2018.02)
(58) Field of Classification Search
CPC . H04L 43/0823; H04L 43/08; H04L 65/1066; H04L 67/12; H04L 67/1002; H04L 49/90; H04L 67/26; H04L 67/2814; H04L 1/0002; H04L 47/10; H04L 47/32; G06F 17/30545; G06F 17/30554; G06F 16/381; G06F 16/93; G06F 3/1236; G06F 3/126; G05B 19/41865; G05B 19/41875; G05B 2219/35001; G05B 2219/31457; G05B 19/4185; G05B 23/0286; G05B 23/0294; G05B 2219/32179; G05B 2219/32181; G05B 2219/45055; Y02P 90/02; G06Q 10/06315
USPC .................................... 709/217, 223; 700/83
See application file for complete search history.

(56) References Cited

U.S. PATENT DOCUMENTS

| | | | | |
|---|---|---|---|---|
| 10,230,571 | B2* | 3/2019 | Rangasamy et al. | G06F 9/44 |
| 2002/0176531 | A1 | 11/2002 | McClelland et al. | |
| 2002/0199082 | A1* | 12/2002 | Shanmugasundram | B24B 37/042 712/208 |
| 2004/0072478 | A1* | 4/2004 | Sticht | G05B 19/4185 439/894 |
| 2004/0128120 | A1* | 7/2004 | Coburn | G05B 17/02 703/26 |
| 2005/0107897 | A1* | 5/2005 | Callaghan | G05B 19/4185 700/87 |
| 2007/0226318 | A1* | 9/2007 | Rydberg | H04L 67/12 709/218 |
| 2013/0211559 | A1* | 8/2013 | Lawson | G06Q 10/06315 700/83 |
| 2013/0212214 | A1* | 8/2013 | Lawson | G06Q 10/06315 709/217 |
| 2014/0047064 | A1 | 2/2014 | Maturana et al. | |
| 2014/0059001 | A1* | 2/2014 | Baik | G06Q 10/06 707/610 |
| 2015/0281355 | A1* | 10/2015 | Maturana | H04L 67/1097 709/202 |
| 2015/0370272 | A1 | 12/2015 | Reddy et al. | |
| 2016/0078053 | A1* | 3/2016 | Liu | G06F 17/30194 707/825 |
| 2016/0112283 | A1 | 4/2016 | Maturana et al. | |
| 2017/0153608 | A1* | 6/2017 | Ueda | G05B 13/024 |
| 2018/0032399 | A1* | 2/2018 | Johnson | G06F 11/2033 |
| 2018/0052451 | A1* | 2/2018 | Billi-Duran | G05B 19/41835 |
| 2018/0069933 | A1* | 3/2018 | Chandra | H04L 67/18 |
| 2018/0091440 | A1* | 3/2018 | Dadashikelayeh | G06N 3/006 |
| 2018/0152534 | A1* | 5/2018 | Kristiansson | G06F 8/60 |
| 2018/0284735 | A1* | 10/2018 | Cella | G05B 23/0289 |
| 2019/0137989 | A1* | 5/2019 | Cella | G05B 23/0297 |
| 2020/0050494 | A1* | 2/2020 | Bartfai-Walcott | G06F 9/5083 |

OTHER PUBLICATIONS

General Electric; Predix Architecture and Service; Sep. 2015; Technical Whitepaper; pp. 1-30 (Year: 2015).*

Hershey, Paul et al., "Metrics for End-to-End Monitoring and Management of Enterprise Systems", IEEE Military Communications Conference (MILCOM), Oct. 2007, (pp. 1-7, 7 total pages).

Wang, Chengen et al., "Conceptual Design of Remote Monitoring and Fault Diagnosis Systems", Information Systems, http://www.sciencedirect.com/science/article/pii/S0306437906000895, vol. 32, Issue 7, Nov. 2007 (pp. 996-1004, 9 total pages).

Tran, Nam-Luc et al., "EQS: An Elastic and Scalable Message Queue for the Cloud", 2011 Third IEEE International Conference on Cloud Computing Technology and Science (CloudCom), Nov. 29-Dec. 1, 2011, DOI:10.1109/CloudCom.2011.59, ((pp. 391-398, 8 total pages).

Zounmevo, Judicael A. et al., "An Efficient Mpi Message Queue Mechanism for Large-scale Jobs", 2012 IEEE 18th International Conference on Parallel and Distributed Systems (ICPADS), Dec. 17-19, 2012), DOI: 10.1109/ICPADS.2012.70, (pp. 464-471, 8 total pages).

* cited by examiner

MESSAGE QUEUE-BASED SYSTEMS AND METHODS FOR ESTABLISHING DATA COMMUNICATIONS WITH INDUSTRIAL MACHINES IN MULTIPLE LOCATIONS

FIELD OF THE INVENTION

Exemplary embodiments described herein relate to message queue-based systems and methods for establishing data communications with, and instructing, industrial machines in multiple locations.

BACKGROUND

Industrial equipment or assets, generally, are engineered to perform particular tasks as part of manufacturing or service processes. Disparate and isolated low-level software and hardware-based controllers have long been used to drive such industrial assets. For example, service centers have numerous machines for inspection, overhauls, and repairs. Most of these are stand-alone stations that have their own user interface, algorithms, and data stores. Retrieving data from these machines is a time consuming and error prone process. It has been traditionally achieved by manually connecting a portable storage device to a machine to download/upload data or by connecting the machine to a local shared folder. This results in the data being locally confined and getting such data to a central store requires additional infrastructure and programming.

In other conventional approaches, a machine would be connected to a remote application or data store in a point-to-point connection configuration. Such communication would typically be highly specific to the particular machine, which means that the established data communications would have to be redesigned and implemented separately for each type of machine. Also, depending on how such communication is implemented, the failure of a network connection may result in machine downtime.

SUMMARY

Disclosed embodiments provide a platform for integrating data for monitoring and prognostics within manufacturing and service processes, such as, for example, the service processes for aircraft engine component parts. It may include software architecture and services designed to make any machine an intelligent asset and to bring visibility, control and analytic insights to every part of industrial infrastructure and operations. This set of components can run on a variety of operating systems, devices and form factors, such as, for example, sensor systems, controllers, gateways, and server appliances.

The disclosed embodiments can increase shop floor productivity by enabling a single operator to control multiple inspection machines. Communications with the machines can be a combination of synchronous (e.g., wait until a response is received) or asynchronous (e.g., send instructions and await responses). This enables the machines to operate independently. The disclosed embodiments provide a "publish-subscribe" architecture pattern, which allows an effective decoupling of the machines and the hardware and software applications which gather data from the machines.

The disclosed embodiments use message queue technology to ensure fault tolerance and network tolerance. Machine operation is not affected by the upload of data (e.g., data output by an inspection machine) to a remote location. If local network connectivity is not available the disclosed system will queue messages locally, in relation to the machine, until the network becomes available, thereby avoiding machine delay or downtime.

The disclosed embodiments allow machines of various types to be connected to the cloud (e.g., to send machine data to the cloud) much more quickly and conveniently than conventional approaches which use machine-specific hardware and software. This enables "horizontal scaling" of the data upload capability, i.e., machines from multiple factories in multiple locations can be "brought on-line" in a much shorter time frame than using conventional systems.

The disclosed embodiments also enable valuable data which conventionally has been confined to stand-alone (i.e., unconnected) machines to be made available to engineers and analysts anywhere in an organization, including remote locations. The availability of such data will result in improved diagnostic and prediction models that will help improve margins and revenues on service contracts and reduce repair time and costs.

Disclosed embodiments provide a "digital thread," i.e., a seamless flow of data between systems that were previously isolated. This data is essentially the manufacturing "health record," which includes data from a multitude of sources, such as, for example, operator logs, manufacturing parameters, inspection imaging, and service reports. For example, one could compile digital threads across multiple manufacturing plants to get a full understanding of the efficiency and health of particular processes and product lines. A digital thread can be defined throughout the entire life cycle of complex manufactured products, e.g., aircraft engines, including factories that produce advanced materials and components, design and development, and maintaining the product throughout operational service, which may continue for decades.

Disclosed embodiments may provide integrating and aggregating data from design to service and leveraging analytics to support optimal decision-making which allows manufacturers to drive improvements in end-to-end production. Analyzing data in context and providing the right information at the right time allows for better decision support throughout the manufacturing and service processes. Data-driven analytics of this sort, encompassing machines, material, people and processes, can transform the factories of today.

In one aspect, the disclosed embodiments provide a method, and corresponding system, for establishing data communications with, and instructing, industrial machines in multiple locations. The method includes generating, using a first application, one or more machine communication messages. Each machine communication message contains data produced by one of a plurality of machines located at a first location. An instance of the first application runs on a processor of each of the plurality of machines. The method further includes sending the machine communication messages to a first message queue via a local area network. The method further includes retrieving, using a first server at a remote location connected via a network, the machine communication messages from the first message queue; and extracting from the messages, at the remote location, the data produced by the plurality of machines. The sending of the machine communication messages and the retrieving of the machine communication messages are done asynchronously.

In disclosed embodiments, the method may include generating, using the processors of respective ones of the plurality of machines, one or more data messages, each of the data messages containing output data produced by the respective machines. The method may further include sending the data messages to a second message queue via the local area network at the first location. The method may further include retrieving, using an application running on the processor of the first server or a processor of a second server, the messages from the second message queue and extracting the output data. The method may further include sending, using the retrieving application, the extracted output data to a remote storage which is connected via the network to at least two of the multiple locations.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

DETAILED DESCRIPTION

The disclosed embodiments provide industrial data integration system. In disclosed embodiments, the system has the form of a services integration system (SIS) for data interoperability and federation within and across service functions of an industrial concern, e.g., a manufacturer of aviation engine parts, such as General Electric. The SIS is configured to leverage service data to achieve improved product design and manufacturing. The system allows for fundamental changes to service operations to enhance customer experience and internal productivity.

In the service facility, data may be produced by industrial assets such as inspection machines (e.g., coordinate measuring machines) and manufacturing machines (e.g., milling machines, cutting machines, computer numeric control) and/or data may be manually entered. In particular, there may be data produced by service operations which digitally capture dimensional and qualitative part information. Data may also be produced by the collection of part metadata and the flagging of part deviations. The SIS provides data storage capabilities which increase available part data, improves data quality, improves data access and retrieval, and improves data sharing across locations.

Figure 1:
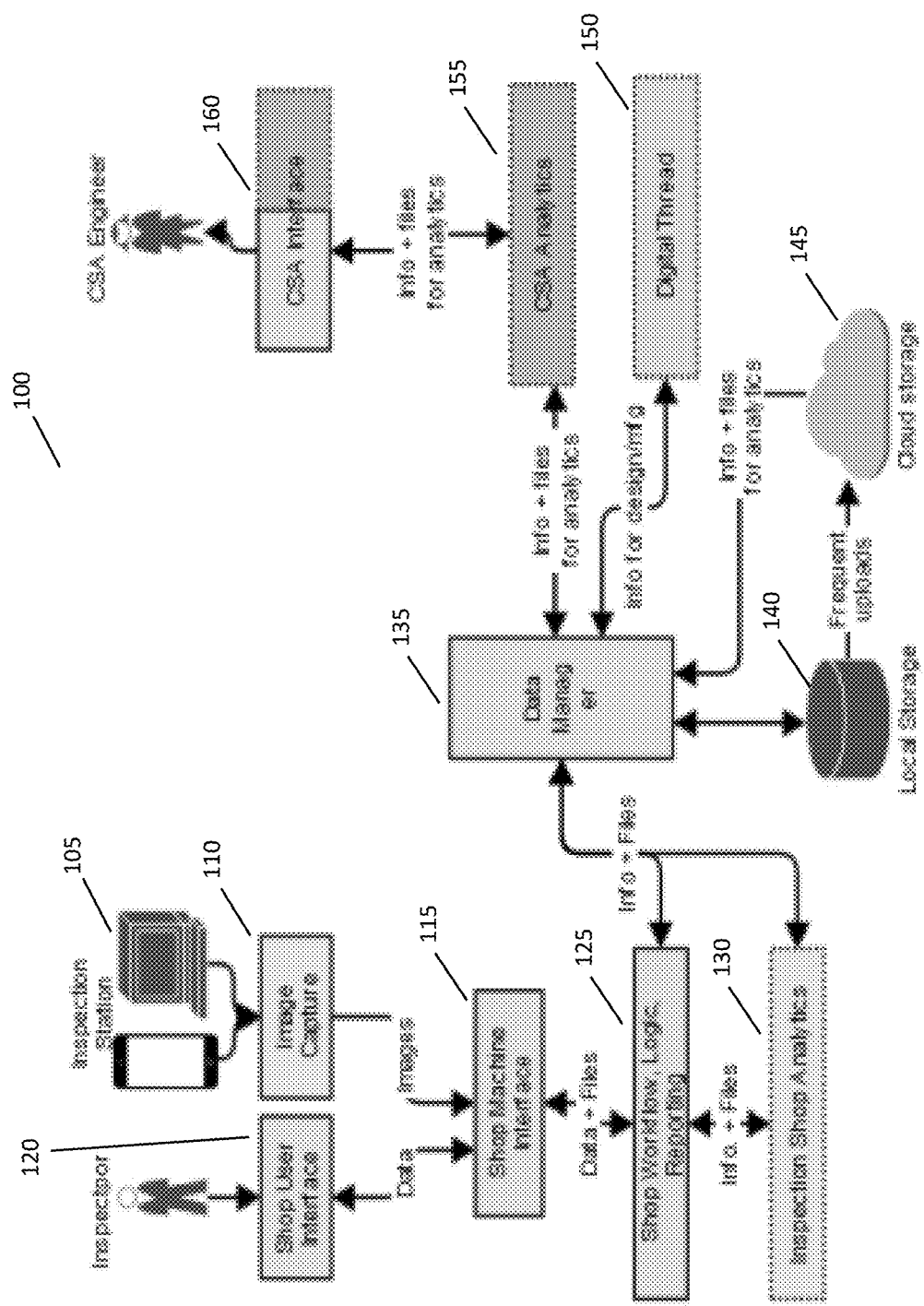
FIG. 1 is a block diagram of an embodiment of an industrial data integration system.

FIG. 1 is a high-level block diagram showing the flow of data in an embodiment of an industrial data integration system 100. An industrial asset, such as, for example, an inspection station 105 may operate in a service facility to inspect manufactured parts which have been returned for service. Disclosed embodiments may include digital data from part inspection which occurs following the finishing stage of production as a fabricated unit part moves to the test and validation phase. Numerous nondestructive evaluation (NDE) technologies exist to evaluate the quality of a part, in conjunction with the data recorded during the manufacturing process, and appropriate ones are selected based upon design requirements for the part in question. These technologies include, for example, x-ray, liquid penetrant or UVT dye, ultrasound, eddy current, etc.

The inspection station 105 generates data during operation, such as, for example, image data from image capture 110 during an inspection process in a service facility. This image data is sent to a shop-machine interface 115, which may be a server connected to the inspection station 105. In such a case, the shop-machine interface 115 may be running software to provide a microservice configured to receive the image data from the inspection station 105 and put it in an asynchronous message format for forwarding the data through a network.

A shop user interface 120 may also be connected to the shop-machine interface 115. The user interface 120 can perform functions such as, for example, allowing inspection data to be manually entered. The user interface 120 may also allow a user to retrieve, from local storage, inspection data relating to the industrial assets at a particular location.

The inspection data from the shop-machine interface 115, which may be in the form of data messages, is sent to a local platform 125 (e.g., server) for monitoring and reporting of shop workflow. The data messages may also be sent to a local platform 130 (e.g., server) which performs various types of shop analytics for use in evaluating service processes. The data from the shop workflow/reporting 125 and the shop analytics 130 is sent to a data manager 135 for further processing. The data manager 135 may send the data to be stored on a local storage 140, e.g., a storage facility provided at the same location as the industrial assets. In turn, data is frequently uploaded to cloud storage 145, such as, for example, a data lake. The data manager 135 may also send data messages with machine instructions (e.g., instructions to start or stop machine operation) to the shop machine interface 115. In particular embodiments, portions of the data may be returned from the cloud storage 145 to the data manager 135 to be forwarded to specific processes. For example, a portion of the data which is relevant to design and manufacturing operations may be sent various engineering facilities via a network which may be referred to generally as a "digital thread" 150. A portion of the data which is relevant to customer service agreement (CSA) engineering analytics may be sent to a CSA analytics platform 155 (e.g., server) which provides a user interface 160 to CSA engineering facilities.

Figure 2:
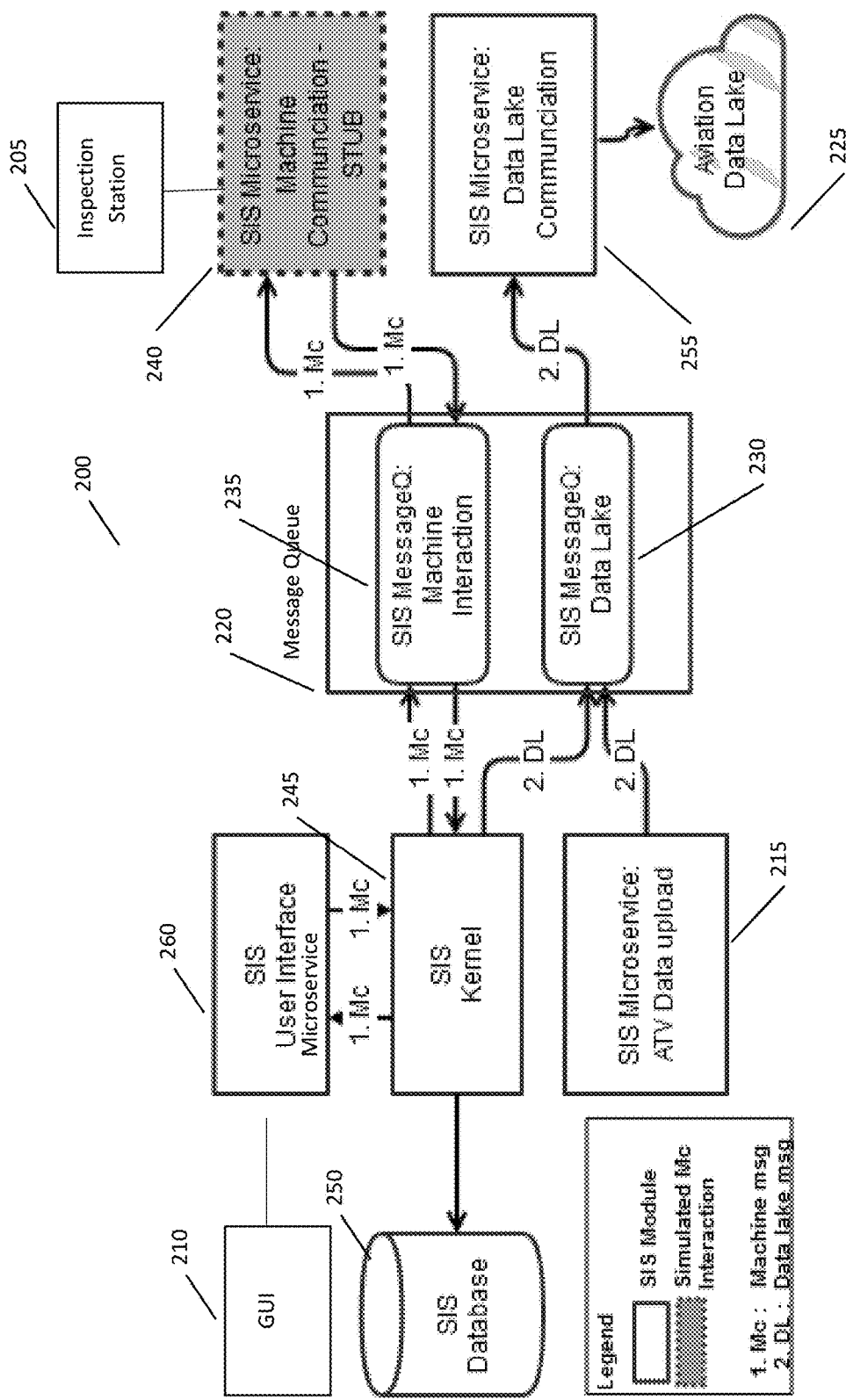
FIG. 2 is a block diagram of an embodiment of an industrial data integration system which sends industrial machine output data to a local queue for periodic uploading to a common remote storage.

FIG. 2 is a block diagram of an embodiment of an industrial data integration system 200 which sends industrial machine output data to a local queue for periodic uploading to a common remote storage. In disclosed embodiments directed to service facilities, the system may be referred to as a services integration system (SIS). The system 200 provides a data capture subsystem for capturing source data from industrial assets, such as, for example, an inspection station 205. The data may be captured by various different methods, including graphical user interfaces 210 and batch processes, depending on the technical characteristics of the underlying inspection system. For example, the data may be passed to an SIS microservice generic upload. In disclosed embodiments, the microservice may be invoked as representational state transfers (REST) calls over HTTP. The REST calls may use JSON format for the request (e.g., service call). Other suitable formats may also be used. REST services provide an architectural style and communication approach that is easy to consume by other services or applications (e.g., in a cloud environment) via their web Application Programming Interface (API).

In disclosed embodiments, the data capture subsystem may be built outside of the SIS, e.g., as part of an inspection system. Alternatively, the data capture subsystem may be part of the SIS system, such as, for example, in the case of an aid-to-visual (ATV) data upload 215. The ATV inspection system stores defects, e.g., crack lengths, in a file along with separately stored corresponding images of the defects. The ATV data capture subsystem, including the ATV data upload microservice 215, asynchronously pulls the data and images from the inspection station, combines them with other information such as, for example, operational data, and then passes them to the REST service.

In disclosed embodiments, the SIS provides a generic upload component in the form of a microservice akin to the ATV data upload microservice 215 that reads inspection data from a REST service end-point, validates the data and then produces a message in the message queue to be sent to a particular destination. The REST service takes data in an extensible generic format that can handle multiple types of inspection data, including, e.g., images, videos and metadata. The data may be packaged in a compact binary format prior to sending it to the message queue 220 to minimize network usage. In disclosed embodiments, a protocol buffer format may be used, which, in addition to being compact, provides a schema to which the data conforms to assure that the message is understood when received. To increase fault-tolerance and robustness, the generic upload should be located at the same site, e.g., the same local area network (LAN), as the data capture subsystem.

As discussed above, the captured data is read from a REST service end-point and sent as a message to the message queue 220, which is at the same location as the industrial assets. Such an arrangement allows for data to be held in the queue 220 until communication to remote storage, e.g., a data lake 225, is available. The use of a queue allows for data acquisition to continue without interruption regardless of the state of external network communications. Various types of asynchronous message queuing software may be used for the message queue 220 subsystem, such as, for example, Rabbit MQ (provided by Pivotal). In disclosed embodiments, the following independent queues may be set up within the message queue subsystem.

Data lake queue 230: This queue is an instantiation of a remote message queue that sends data to a data lake, such as, for example, a data lake relating to aviation components, e.g., aircraft engines. The data lake is configured to store large data samples (i.e., data samples to which the term of art "big data" would be applicable), such as, for example, terabytes or more of data, which would be too large to fit on a single machine and are therefore stored across multiple machines. It is implicit that the data lake is configured and scaled according to overall data storage requirements and that, in disclosed embodiments, the data could be stored on a single machine or multiple machines, depending upon the technical characteristics of the machines and the quantity of data in question. In disclosed embodiments, the data lake may be implemented as cloud storage via the Internet.

There could also be additional remote message queues. This type of queue, which is akin to the data lake queue 230, sends the data to a remote storage location, such as, for example, an on-site or off-site database or another type of data repository. The queue can be configured to send the data to multiple repositories or a single repository depending on the specific use case. In disclosed embodiments, an instantiation of this system may have multiple remote message queues.

Machine communication (or "interaction") queue 235: This queue supports data communication with, or among, industrial assets, e.g., back and forth to a particular inspection station or between particular inspection stations.

In disclosed embodiments, the SIS includes a microservice for machine communication 240, which runs on an industrial asset, e.g., an inspection station, and performs the following services. The machine communication microservice 240 waits for messages from the machine communication queue 235 directed to the particular machine on which it is running, such as, for example, messages instructing an inspection station 205 to start an inspection or perform a calibration. The machine communication microservice 240 adds messages to the machine communication queue 235 containing data generated by the particular machine, e.g., inspection result data. The machine communication microservice 240 may communicate with other industrial assets via the message queue 220, i.e., machines other than the machine on which the microservice is running (e.g., inspection station 205). This machine-to-machine communication can be useful, for example, in instances in which a single inspection operation involves multiple inspection stations through which a part must pass sequentially. As a further example, machine-to-machine communication may be useful when multiple inspection stations share a resource, e.g., a camera or a robot which positions a part for inspection.

In disclosed embodiments, the messages in the machine communication queue 235 may be taken by an SIS kernel 245 (e.g., platform or server) in the same location as the machines. The SIS kernel 245 unpacks the messages from the machine communication queue 235 to extract the data therein, e.g., inspection data. The machine data may be stored in a database 250 in a local storage, e.g., a storage at the same location as the machines. The local storage of data allows for data analysis and other functions to be performed without having to retrieve the data from remote storage, e.g., data lake 225. The SIS kernel 245 may also take the messages retrieved from the machine communication queue 235 and put them in the data lake queue 230. By virtue of this configuration, the machine data for a particular location can be stored both locally and remotely, thereby safeguarding the data through redundancy and allowing analysis to be performed both at local (e.g., a service facility) and remote (e.g., system-wide or global) levels.

In disclosed embodiments, the SIS provides one or more remote storage communication microservices which consume remote message queue messages, e.g., the data lake queue, and sends them to respective storage destinations. For example, the SIS data lake microservice 255 is a communication microservice which sends data to a data lake 225, e.g., the GE Aviation data lake, which is global repository of GE Aviation data. The term "remote storage" (or "remote storage location") may be used to refer to a data repository having a distinct instantiation, and possibly a separate physical location, from that of the industrial asset data source, e.g., an inspection station. Remote storage is often characterized by being a storage facility which is common to multiple industrial locations. Remote storage may be implemented in various forms, such as, for example, a local database, a remote database, cloud storage or various other types of data repositories.

A remote storage communication microservice takes a message from a queue, unpacks it, and performs any transformation which is necessary to send the message to the particular data repository in which it is to be stored. In disclosed embodiments, messages are removed from the message queue 220 only after the microservice component determines that the message has been successfully sent to the remote storage location (e.g., data lake 225). If the microservice is not able to successfully send the message to the data repository to which the message is destined, the message remains in the queue until the message can be successfully sent to the data repository.

In disclosed embodiments, the SIS may include a user interface, which may be, for example, a graphical user interface (GUI) 210 that runs in a web browser. The SIS user interface may have one or more of the following use cases.

The user interface 210 can be configured to drive one or more industrial assets, e.g., inspection stations (e.g., 205). In such a case, the user may select a particular inspection station and have it start an inspection by sending instructions via the SIS user interface microservice 260 (or "SIS GUI microservice"). After the inspection is completed, the user interface 210 will receive the results of the inspection, which may be, for example, in the form of an image, a video, or other types of data. The user can accept or reject the inspection result data and, in some embodiments, modify the results. The inspection result data may then be sent to the SIS user interface microservice 260, which puts the data in the proper form to be sent to the message queue 220.

The user interface 210 may interact with one or more cameras which are taking images or videos of component parts, such as, for example, parts which are passing through and/or between industrial assets as part of a manufacturing process. In such a case, a user, e.g., an inspector, may select a particular camera, view the camera image, and evaluate and record the condition of the part, e.g., by entering textual or numeric data to be passed with the image data. The image and evaluation data is then sent to the SIS user interface microservice 260, which puts the data in the proper form to be sent to the message queue 220.

The user interface 210 may allow the user to upload an image, video, or other type of file generated by an industrial asset, e.g., an inspection station 205. In such a case, the user, e.g., an inspector, may evaluate and record the condition of the parts, e.g., by entering textual or numeric data to be passed with the image (i.e., metadata). The image and evaluation data is then sent to the SIS user interface microservice 260, which puts the data in the proper form to be sent to the message queue 220.

The SIS user interface microservice 260, as noted above, receives data from the user interface 210 and formats it to be sent to the message queue 220 and can also control industrial assets. In disclosed embodiments, SIS user interface microservice 260 packages data from the user interface 210 and sends the data to a generic upload microservice (e.g., a microservice akin to the ATV data upload microservice 215) via a REST service. The SIS user interface microservice 260 may also be configured to send and receive messages from the machine communication queue 235 described above. Such messages may be commands to a machine, such as, for example, instructing the machine to start an inspection or perform a calibration. The messages returned from a machine may be, for example, inspection data such as images, video or other data about the image. The SIS user interface microservice 260 unpackages the returned messages and forwards the resulting data to the user interface.

Figure 3:
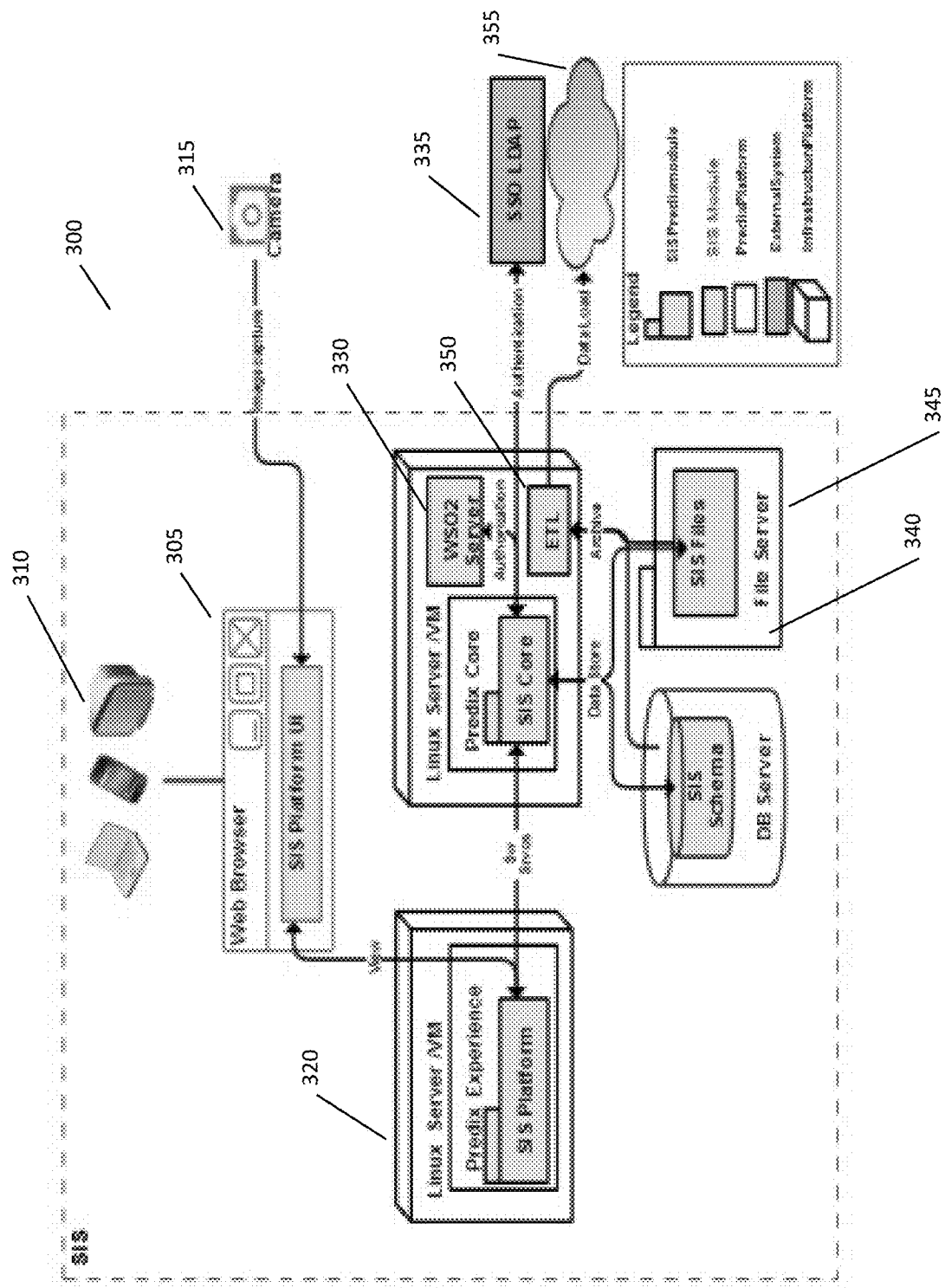
FIG. 3 is a block diagram of an embodiment of an industrial data integration system.

FIG. 3 is a block diagram of an embodiment of a services integration system (SIS) 300. In the embodiment depicted, a graphical user interface (GUI) 305 is implemented using an application running in a web browser on a computing device 310, e.g., a desktop computer, laptop computer, or a mobile device. The GUI 305 receives image data, e.g., from a camera 315 of an inspection station. In disclosed embodiments, the GUI 305 is implemented by an SIS platform server 320 which is implemented on a Linux server/virtual machine. The SIS platform server 320 acts as a user-facing node (i.e., "experience") of an industrial asset management platform (AMP), such as, for example, the Predix™ platform available from General Electric. The Predix platform is discussed in further detail below. The SIS platform server 320 is connected to an SIS core server 325 (e.g., kernel) implemented on a Linux server/virtual machine. The SIS core server 325 may be implemented as a Predix core, which is an implementation that facilitates interaction with a Predix experience (e.g., the SIS platform server 320).

Figure 4:
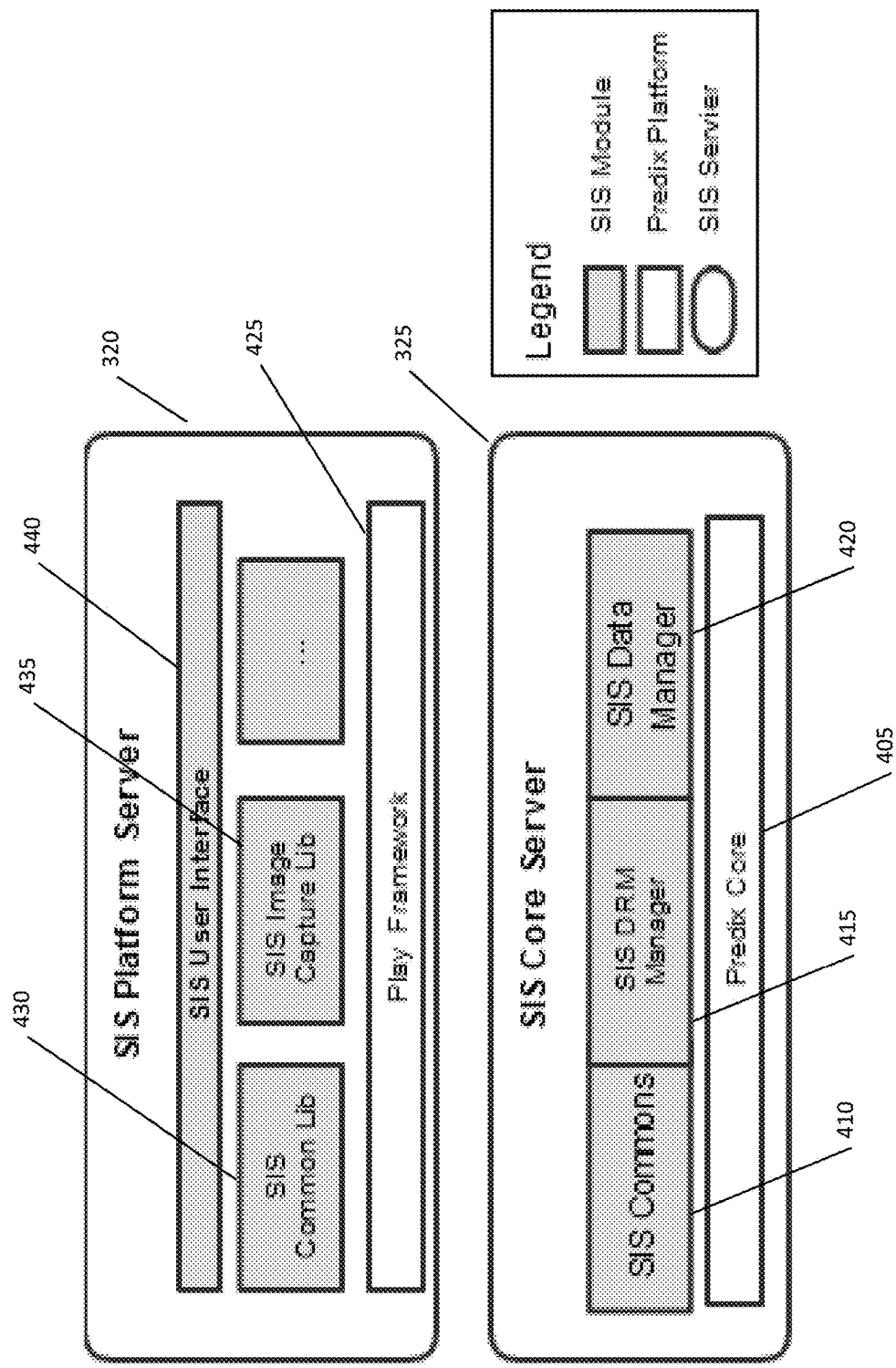
FIG. 4 depicts the software architecture of a platform server and a core server in an industrial data integration system.

FIG. 4 depicts an embodiment of a software architecture for the SIS platform server 320 and SIS core server 325. The SIS core server 325 is based on a Predix core 405, which acts, in effect, as an operating system to facilitate interaction with the SIS platform server 320. The Predix core 405 interacts with an SIS common library 410, an SIS data reference model (DRM) 415, which determines how data is described, categorized, and shared, and an SIS data manager 420, which controls the flow and handles the formatting of the SIS data. The SIS platform server 320 is based on a Predix play framework 425. The SIS platform server 320 interacts with an SIS common library 430 and an SIS image capture library 435. The top level of the SIS platform server 320 is the SIS user interface 440.

Referring again to FIG. 3, the core 325 may use a server running open source middleware 330, e.g., such as that provided by WSO2, Inc., to implement authorization. Authentication may be performed using a single sign on (SSO) lightweight directory access protocol (LDAP) 335. The SIS core 325 communicates with local SIS storage, e.g., a local database server 340 and file server 345 which store data using a particular SIS schema. An extract, transform, load (ETL) facility 350 takes data from the SIS file server 345 and sends it to a remote storage, e.g., a data lake 355.

Figure 5:
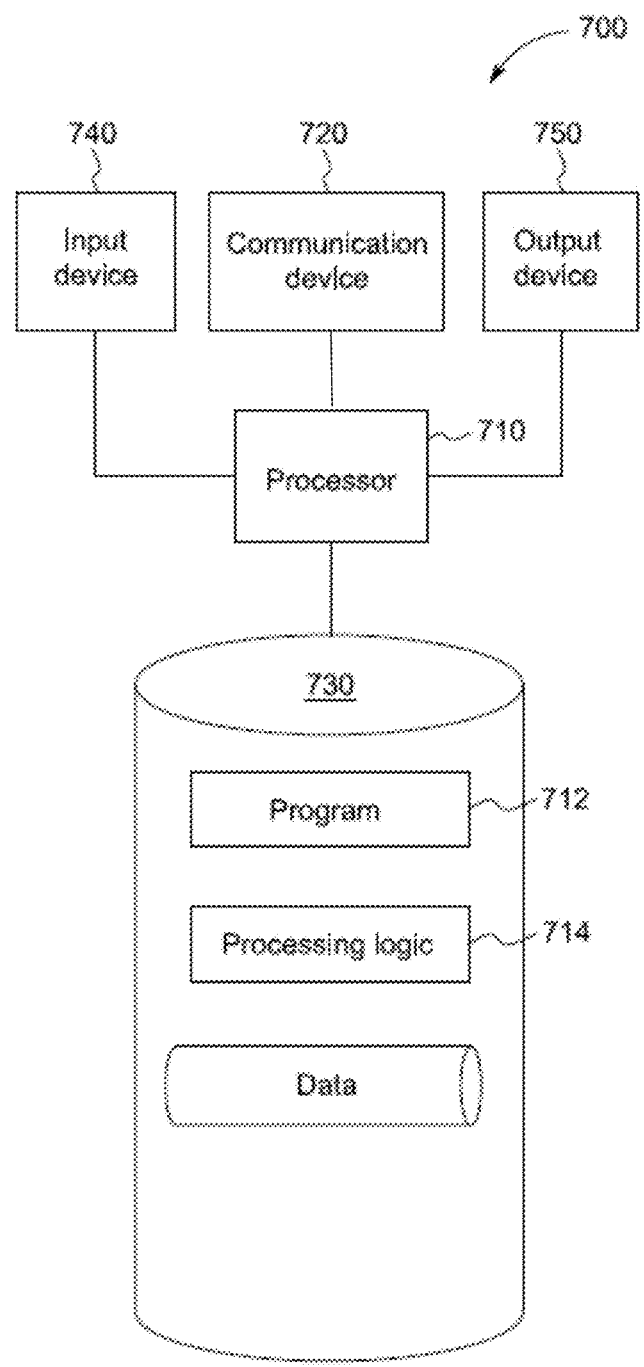
FIG. 5 illustrates a processing platform for implementing embodiments described herein.

Note the embodiments described herein may be implemented using any number of different hardware configurations. For example, FIG. 5 illustrates a processing platform 700 that may be, for example, associated with components of the systems disclosed herein. The processing platform 700 comprises a processor 710, such as one or more commercially available central processing units (CPUs) in the form of one-chip microprocessors, coupled to a communication device 720 configured to communicate via a communication network (not shown). The communication device 720 may be used to communicate, for example, with one or more users. The processing platform 700 further includes an input device 740 (e.g., a mouse and/or keyboard to enter information) and an output device 750.

The processor 710 also communicates with a memory/storage device 730. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or processing logic 714 for controlling the processor 710. The processor 710 performs instructions of the programs 712, 714, and thereby operates in accordance with any of the embodiments described herein. For example, the processor 710 may receive data and then may apply the instructions of the programs 712, 714 to carry out methods disclosed herein.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices. Information may be received by or transmitted to, for example: (i) the platform 700 from another device; or (ii) a software application or module within the platform 700 from another software application, module, or any other source.

It is noted that while progress with industrial equipment automation has been made over the last several decades, and assets have become 'smarter,' the intelligence of any individual asset pales in comparison to intelligence that can be gained when multiple smart devices are connected together. Aggregating data collected from or about multiple assets may enable users to improve business processes, for example by improving effectiveness of asset maintenance or improving operational performance, if appropriate. Industrial-specific data collection and modeling technology may be developed and applied.

In an example, an industrial asset may be outfitted with one or more sensors configured to monitor respective ones of an asset's operations or conditions. Such sensors may also monitor the condition of a component part being processed, e.g., inspected, by the asset. Data from the one or more sensors may be recorded or transmitted to a cloud-based or other remote computing environment. By bringing such data into a cloud-based computing environment, new software applications informed by industrial process, tools and know-how may be constructed, and new physics-based analytics specific to an industrial environment may be created. Insights gained through analysis of such data may lead to enhanced asset designs, or to enhanced software algorithms for operating the same or similar asset at its edge, that is, at the extremes of its expected or available operating conditions. The data analysis also helps to develop better service and repair protocols and to improve manufacturing processes.

The systems and methods for managing industrial assets may include or may be a portion of an Industrial Internet of Things (IIoT). In an example, an IIoT connects industrial assets, such as turbines, jet engines, and locomotives, to the Internet or cloud, or to each other in some meaningful way. The systems and methods described herein may include using a "cloud" or remote or distributed computing resource or service. The cloud may be used to receive, relay, transmit, store, analyze, or otherwise process information for or about one or more industrial assets. In an example, a cloud computing system may include at least one processor circuit, at least one database, and a plurality of users or assets that may be in data communication with the cloud computing system. The cloud computing system may further include, or may be coupled with, one or more other processor circuits or modules configured to perform a specific task, such as to perform tasks related to asset maintenance, analytics, data storage, security, or some other function. Such cloud-based systems may be used in conjunction with the message queue-based systems described herein to provide widespread data communication with industrial assets, both new and old.

The flowcharts and/or block diagrams in the figures illustrate the architecture, functionality, and operation of possible implementations of systems, methods and computer program products according to various embodiments of the present invention. In this regard, each block in the flowcharts and/or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
receiving data at a shop-machine interface located at respective multiple locations, the data captured by one or more of a plurality of machines during operation of the plurality of machines that are locally connected to the respective shop-machine interface;
generating, using a first application, one or more machine communication data messages, each machine communication data message containing the received data produced by the one or more of the plurality of machines, wherein the first application comprises a machine communication microservice sending a machine-to-machine communication when a single operation involving multiple stations sequentially passes from a first one of the plurality of machines to another of the plurality of machines that are sharing a resource used for the sequential operation;
sending the machine communication data messages from the machine communication microservice to a local message queue via a local area network in response to a network connection with a remote server being unavailable; and
forwarding the queued machine communication data messages to the remote server when the network connection is available,
wherein the generating further comprises reading image data captured by the plurality of machines from a representational state transfer (REST) endpoint, and packaging the image data read from the REST endpoint into the one or more machine communication data messages sent to the local message queue.

2. The method of claim 1, wherein the method further comprises:
receiving, from the message queue via the local area network, machine communication messages addressed to respective ones of the machines, wherein the receiving of the machine communication messages uses the first application or a second application running on the processor of each of the respective machines;
extracting from the received machine communication messages, at the respective machines, machine instruction data; and
providing the machine instruction data to the respective machines.

3. The method of claim 2, wherein the method further comprises:
generating, using a user interface application running on a user interface device, user interface messages containing machine instruction data for one of the machines; and sending, by the user interface application, the user interface messages to the local message queue via the local area network.

4. The method of claim 3, wherein the user interface application is a web application running using a web browser.

5. The method of claim 1, wherein the method further comprises:
generating, using the processors of respective ones of the plurality of machines, one or more data messages, each of the data messages containing output data produced by the respective machines;
sending the data messages to a second message queue via the local area network at the first location;
retrieving, using an application running on the processor of the first server or a processor of a second server, the messages from the second message queue and extracting the output data; and
sending, using the retrieving application, the extracted output data to a remote storage which is connected via the network to at least two of the multiple locations.

6. The method of claim 5, further comprising storing the extracted output data of the respective machines in a local storage.

7. The method of claim 5, wherein the output data comprises image data.

8. The method of claim 5, wherein the output data comprises inspection data relating to a manufactured part being inspected by a respective one of the machines.

9. The method of claim 1, wherein the generating comprises converting image data captured by the plurality of machines in an extensible generic format into a binary format, and storing the image data converted to binary format within the one or more machine communication data messages sent to the local message queue.

10. The method of claim 1, wherein the generating comprises combining image data captured by the plurality of machines with operational data about the plurality of machines when the image data was captured, and storing the combined image and operational data within the one or more machine communication data messages sent to the local message queue.

11. A system for establishing data communications with and instructing industrial machines in multiple locations, the system comprising:
a shop-machine interface that is locally connected to one or more of a plurality of machines and which is configured to receive data captured by one or more of the plurality of machines during operation;
a machine communication microservice in machine-to-machine communication with one or more of the plurality of machines connected to the shop-machine interface, the machine communication microservice sending a machine-to-machine communication when a single operation involving multiple stations sequentially passes from a first one of the plurality of machines to another of the plurality of machines that are sharing a resource used for the sequential operation
the machine communication microservice configured to (a) generate one or more machine communication data messages, each machine communication data message containing the received data produced by the one or more of the plurality of machines; and (b) send the machine communication data messages to a local message queue via a local area network in response to a network connection with a remote server being unavailable; and a data manager configured to forward the queued machine communication data messages to the remote server when the network connection is available,
wherein the machine communication microservice is further configured to read image data captured by the plurality of machines from a representational state transfer (REST) endpoint, and package the image data read from the REST endpoint into the one or more machine communication data messages sent to the local message queue.

12. The system of claim 11, wherein the machine communication microservice is further configured to perform (a) receiving, from the local message queue via the local area network, machine communication messages addressed to respective ones of the machines; (b) extracting from the received machine communication messages, at the respective machines, machine instruction data; and (c) providing the machine instruction data to the respective machines.

13. The system of claim 12, further comprising a user interface microservice configured to perform: (a) generating one or more machine communication messages, each of the machine communication messages containing machine instruction data for one of the machines; and (b) sending the one or more generated machine communication messages to the local message queue via the local area network.

14. The system of claim 13, wherein the user interface is a web application running using a web browser.

15. The system of claim 11, wherein:
the plurality of machines are configured to perform: (a) generating one or more data messages, each of the data messages containing output data produced by the respective machines; and (b) sending the data messages to a second message queue; and
an application running on the first server is configured to perform: (a) retrieving the messages from the second message queue and extracting the output data; and (b) sending the extracted output data to a remote storage.

16. The system of claim 15, further comprising a local storage storing the extracted output data of the respective machines.

17. The system of claim 15, wherein the remote storage is a data lake.

18. The system of claim 15, wherein the output data comprises inspection data relating to a manufactured part being inspected by a respective one of the machines.

19. A computing system comprising:
a communication device that is locally connected to a plurality of inspection stations via an interface, the communication device configured to receive image data from the plurality of inspection stations during an inspection operation; and
a processor configured to
generate one or more data messages including the received image data received from the locally connected plurality of inspection stations, and queue the generated one or more data messages within a local message queue accessible to a remote server when a network connection between the computing system and the remote server is not available,
send a machine-to-machine communication when a single operation passes from a first one of the plurality of inspection stations to another of the plurality of inspection stations that are sharing a resource used for the sequential operation, send the machine communication data messages to the local message queue via a local area network in response to a network connection with a remote server being unavailable, and forward the queued machine communication data messages to the remote server when the network connection is available, wherein the processor is further configured to read image data captured by the plurality of machines from a representational state transfer (REST) endpoint, and package the image data read from the REST endpoint into the one or more machine communication data messages sent to the local message queue.

* * * * *